(12) United States Patent
Matsuzawa et al.

(10) Patent No.: US 6,615,499 B1
(45) Date of Patent: Sep. 9, 2003

(54) METHOD FOR PRODUCING CERIUM OXIDE, CERIUM OXIDE ABRASIVE, METHOD FOR POLISHING SUBSTRATE USING THE SAME AND METHOD FOR MANUFACTURING SEMICONDUCTOR DEVICE

(75) Inventors: Jun Matsuzawa, Tsukuba (JP); Atsushi Sugimoto, Hitachi (JP); Masato Yoshida, Tsukuba (JP); Keizou Hirai, Hitachiota (JP); Toranosuke Ashizawa, Hitachinaka (JP); Yuuto Ootsuki, Hitachi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/979,733

(22) PCT Filed: May 26, 2000

(86) PCT No.: PCT/JP00/03390

§ 371 (c)(1),
(2), (4) Date: Nov. 28, 2001

(87) PCT Pub. No.: WO00/73211

PCT Pub. Date: Dec. 7, 2000

(30) Foreign Application Priority Data

May 28, 1999 (JP) ............................................ 11-150049
Aug. 30, 1999 (JP) ............................................ 11-243398

(51) Int. Cl.⁷ ............................ C09K 3/14; C01F 17/00
(52) U.S. Cl. ............................. 31/309; 51/307; 423/263
(58) Field of Search ....................... 51/307, 309; 106/3; 438/692, 693; 451/41; 423/263

(56) References Cited

U.S. PATENT DOCUMENTS 6,343,976 B1 * 2/2002 Yoshida et al. ............... 451/41

FOREIGN PATENT DOCUMENTS

| EP | 0816457 | | 1/1998 |
| EP | 0820092 | | 1/1998 |
| EP | 0939431 | | 9/1999 |
| JP | 10106986 | | 4/1998 |
| JP | 10106987 | | 4/1998 |
| JP | 10106992 | | 4/1998 |
| JP | 10152673 | | 6/1998 |
| JP | 11181403 | * | 7/1999 |
| WO | 9814987 | * | 4/1998 |

* cited by examiner

Primary Examiner—Michael Marcheschi
(74) Attorney, Agent, or Firm—Antonelli, Terry, Stout & Kraus, LLP

(57) ABSTRACT

The present invention provides a method for producing cerium oxide comprising rapid heating of cerium salts to a calcining temperature to calcine them, a cerium oxide abrasive containing the cerium oxide produced by the method and pure water, an abrasive containing a slurry in which cerium oxide particles having an intensity ratio of an area of a primary peak appearing at 27 to 30° to that of a secondary peak appearing at 32 to 35° (primary peak/secondary peak) in a powder X-ray diffraction chart of 3.20 or more are dispersed in a medium, an abrasive containing a slurry in which cerium oxide particles whose bulk density is 6.5 g/cm³ or less are dispersed into a medium, an abrasive containing a slurry in which abrasive grains having pores are dispersed into a medium, a method for polishing a substrate comprising polishing a predetermined substrate using the abrasive; and a method for manufacturing a semiconductor comprising the step of polishing by the abrasive.

3 Claims, No Drawings

METHOD FOR PRODUCING CERIUM
OXIDE, CERIUM OXIDE ABRASIVE,
METHOD FOR POLISHING SUBSTRATE
USING THE SAME AND METHOD FOR
MANUFACTURING SEMICONDUCTOR
DEVICE

TECHNICAL FIELD

The present invention relates to a method for producing cerium oxide, a cerium oxide abrasive, a method for polishing a substrate using the same, and a method for manufacturing a semiconductor device, and more specifically relates to a method for producing cerium oxide particles with high productivity and yield, a cerium oxide abrasive that can provide high speed polishing without causing scratches irrespective of the film properties, a method for polishing a substrate using the same, and a method for manufacturing a semiconductor device having high reliability with high productivity and yield.

BACKGROUND ART

In a manufacturing process of a semiconductor device, as a chemical-mechanical polishing method for smoothing an inorganic insulating layer such as an $SiO_2$ insulating layer, which is formed by a plasma CVD method, or low-pressure CVD method, a CMP method has been conventionally used. As an abrasive used for the CMP method, a colloidal silica series abrasive or slurry using silica particles, cerium oxide particles or the like as the abrasive grain is used.

The colloidal silica series abrasive is produced by grain-growing silica particles by a process of pyrolyzing silicic acid tetrachloride or the like and pH adjusting the silica particles with an alkaline solution containing no alkali metal such as ammonia, etc. However, such an abrasive has a technical problem that the polishing speed on an inorganic insulating film is not sufficient and higher polishing speed is required for practical use.

On the other hand, as a glass-surface abrasive for a photomask, a cerium oxide abrasive has been used. Cerium oxide particles have lower hardness than silica particles or alumina particles, therefore it tends to cause few scratches on the surface to be polished and thereby it is useful in finishing mirror polishing. Further, as the cerium,oxide has been known as a strong oxidant, it has chemically active properties. Thus, by utilizing these advantages of the cerium oxide, the application of it to a chemical-mechanical abrasive for the insulating film is useful.

However, when a cerium oxide abrasive is applied to inorganic insulating film polishing as it is to polish a glass surface for a photomask, a problem arises that it causes scratches to a degree that can be visually noticed on the insulating film surface as the diameter of the primary grain is large. Further, there is another problem that some types of a cerium oxide abrasive greatly change its polishing speed depending on the film properties of a surface to be polished.

An object of the present invention is to provide a method of easily producing cerium oxide that can polish a surface to be polished such as an $SiO_2$ insulating film, etc., at high speed and good yield without causing scratches.

Another object of the present invention is to provide a cerium oxide abrasive having cerium oxide as an essential component that can polish a surface to be polished such as an $SiO_2$ insulating film, etc., at high speed irrespective of the film properties without causing scratches.

Yet another object of the present invention is to provide a method for polishing a substrate that can polish a surface to be polished such as an insulating film, etc., at high speed irrespective of film properties without causing scratches.

Still further object of the present invention is to provide a method for manufacturing a semiconductor device in which a semiconductor device having excellent reliability can be manufactured with high productivity and yield.

DISCLOSURE OF THE INVENTION

The present invention relates to a method for producing cerium oxide comprising rapid heating of cerium salts to a calcining temperature to calcine them.

Further, the present invention relates to the method for producing cerium oxide in which the temperature rise rate of raising to the calcining temperature is set to 20 to 200° C./min.

Further, the present invention relates to the method for producing cerium oxide in which the calcining is performed by a rotary kiln.

Further, the present invention relates to the method for producing cerium oxide in which the calcining temperature is set to 600 to 1,000° C. and the calcining time is set to 30 minutes to 2 hours.

Further, the present invention relates to a cerium oxide abrasive containing the cerium oxide produced by the above-mentioned method for producing cerium oxide and pure water.

The present invention also relates to an abrasive containing a slurry in which cerium oxide particles having an intensity ratio of the area of a primary peak appearing at 27 to 30° to that of a secondary peak appearing at 32 to 35° (primary peak/secondary peak) of 3.20 or more in a powder X-ray diffraction chart are dispersed into a medium.

Further, the present invention relates to an abrasive containing slurry in which abrasive grains having pores are dispersed into a medium.

Further, the present invention relates to an abrasive containing slurry in which cerium oxide particles having a bulk density of 6.5 g/cm$^3$ or less are dispersed into a medium.

Further, the present invention relates to a method for polishing a substrate comprising polishing a predetermined substrate using the above-mentioned abrasive.

Further, the present invention relates to a method for manufacturing a semiconductor device comprising the step of polishing a semiconductor chip on which a silica film is formed with the above-mentioned abrasive.

BEST MODE FOR CARRYING OUT THE INVENTION

The cerium salts to be used in the present invention may include cerium carbonate, cerium sulfate, cerium oxalate and the like. These cerium salts may be hydrates. From the viewpoint of producing a cerium oxide easily with good yield, which is an essential component of a cerium oxide abrasive that can polish a surface to be polished such as an $SiO_2$ insulating film, etc., at high speed without causing scratches, cerium carbonate is preferably used and cerium carbonate hydrate is more preferably used as the cerium salts.

It is preferred that these cerium salts be in the form of powder in terms of workability.

In the method for producing cerium oxide of the present invention, it is necessary to rapidly heat cerium salts to raise the temperature to a calcining temperature and calcine them.

When gradual heating of the cerium salts is conducted to raise the temperature to a calcining temperature and they are calcined, the obtained cerium oxide does not have desired performance, and a cerium oxide abrasive using such cerium oxide is likely to cause scratches on the surface to be polished and high speed polishing becomes difficult.

Here, the temperature rise rate of raising the temperature of cerium salts to a calcining temperature is preferably set to 20 to 200° C./min, and more preferably to 40 to 200° C./min.

Further, while the calcining process may be performed in a batch furnace, it may be preferably performed by a rotary kiln.

Further, the calcining temperature is preferably set to 600 to 1,000° C.

Further, the calcining time is preferably set to 30 minutes to 2 hours.

The rotary kiln is an already known furnace, and a type of the rotary kiln is not limited. There may be mentioned, for example, a material in which a refractory lined cylindrical kiln is provided such that the axis of the kiln is inclined relative to the horizontal line, both ends of the kiln are rotatably supported by the upper and lower side supporting members respectively, and the rotary kiln is rotatably driven through a driving apparatus such as a motor and a gear attached to the output shaft of the driving apparatus with a ring-shaped gear mounted on the periphery of the kiln.

In case of using a rotary kiln, a preferred embodiment is as follows. The temperature in the rotary kiln duct is defined as 600 to 1,000° C. and the rotary kiln is previously heated to the temperature. Then cerium carbonate hydrate is charged into the kiln duct at a predetermined weight per hour, and the rotary kiln is rapidly heated at a temperature rise rate of 20 to 200° C./min. At that time, the filling rate of cerium carbonate relative to the cross-sectional area of the kiln duct is defined as 3 to 10%. Further, a predetermined flow rate of oxygen gas or the like is blown into the kiln duct and the heating of the hydrate is carried out in an oxidizing atmosphere.

It is preferred that an abrasive according to the present invention contains a slurry in which cerium oxide particles having an intensity ratio of the area of a primary peak appearing at 27 to 30° to that of a secondary peak appearing at 32 to 35° (primary peak/secondary peak) of 3.20 or more in a powder X-ray diffraction chart are dispersed into a medium.

In cerium oxide particles dispersed in the slurry in a cerium oxide abrasive of the present invention, the intensity ratio of the area of a primary peak appearing at 27 to 30° to that of a secondary peak appearing at 32 to 35° (primary peak/secondary peak) is preferably 3.20 or more, more preferably 3.20 to 4.20, and most preferably 3.30 to 4.00 from the powder X-ray diffraction chart. Here, the diffraction angle or peak intensity of scattered X-ray obtained by the powder X-ray diffraction reflects the properties relating to atoms which constitute the crystal and their arrangement, and identification of a crystalline substance and structural analysis of crystallizability or the like can be made from the diffraction chart.

The cerium oxide according to the present invention exhibits a cubic system and the primary peak appearing at 27 to 30° in the powder X-ray diffraction chart is analyzed as a [1,1,1] plane and the secondary peak appearing at 32 to 35° therein is analyzed as a [2,0,0] plane.

When a strain is caused by oxygen defect or the like in the crystal of the cerium oxide particles, the strain toward the [1,1,1] plane is increased and the main peak intensity for 27 to 30° is decreased. Thus, the intensity ratio of the area of a primary peak appearing at 27 to 30° to that of a secondary peak appearing at 32 to 35° (primary peak/secondary peak) is decreased. If the intensity ratio of the area of a primary peak appearing at 27 to 30° to that of a secondary peak appearing at 32 to 35° (primary peak/secondary peak) is less than 3.20, the polishing speed can be rapidly decreased in some cases according to film properties of a surface to be polished.

Here, as a measuring device for the powder X-ray diffraction chart, a commercially available device (for example, Geigerflex, trade name, produced by Rigaku) can be used.

The larger the primary grain diameter of the cerium oxide particle is, and the less the crystalline strain is, i.e., the better the crystallizability is, the higher speed polishing becomes possible with respect to an $SiO_2$ insulating film formed by TEOS-CVD method or the like. However, polishing scratches are likely to occur. Accordingly, the cerium oxide particles in the present invention are preferably prepared without enhancing the crystallizability thereof significantly. Further, since the cerium oxide abrasive is used for polishing semiconductor chips, the content of alkali metals and halogens in cerium oxide is preferably limited to 1 ppm or less.

In the abrasive of the present invention, the content of Na, K, Si, Mg, Ca, Zr, Ti, Ni, Cr, and Fe is preferably each 1 ppm or less respectively, and the content of Al is preferably 10 ppm or less.

The cerium oxide particles according to the present invention can be produced by calcining, for example, a cerium compound. However, calcining at a low temperature that does not increase the crystallizability of the cerium particle as much as possible is preferably used for preparing cerium oxide particles, which do not cause scratches on the surface thereof.

The cerium oxide obtained by calcining can be ground by dry grinding with a jet mill or the like, or by wet grinding with a bead mill or the like. The ground cerium oxide particles include single crystalline particles having a small crystalline size, and ground particles which have not been yet ground to the crystalline size. The ground particles are different from an aggregate obtained by reaggregating the single crystalline particles, and comprise two or more crystallites having grain boundaries. When polishing is performed by an abrasive containing the ground particles having the grain boundaries, the stress on polishing breaks the boundaries and it is assumed that an active surface of crystal is continuously generated. Thus, a surface to be polished such as an $SiO_2$ insulating film can be polished at high speed without causing scratches.

The cerium oxide abrasive according to the present invention contains cerium oxide produced by the above-mentioned method for producing cerium oxide and pure water.

The cerium oxide abrasive according to the present invention can be obtained by mixing the cerium oxide particles produced by the above-mentioned method, pure water and a dispersant used as required thereby to disperse the cerium particles. The cerium oxide particles may be, if necessary, classified with a filter or the like. Here, while the concentration of cerium oxide particles is not restricted, it is preferably in a range of 0.1 to 10% by weight, and more preferably in a range of 0.5 to 10% by weight from the viewpoint of easy handling of a suspension (an abrasive).

Dispersants, which can disperse cerium oxide particles into a medium, may be used without limitation. The dispersants, which do not contain metallic ions, may include, for example, (meth)acrylic acid polymer and its ammonium salts; water-soluble organic polymers such as polyvinyl alcohol, etc.; water-soluble anionic surfactants such as ammonium lauryl sulfate, polyoxyethylene lauryl ether ammonium sulfate, etc.; water-soluble nonionic surfactants such as polyoxyethylene lauryl ether, polyethylene glycol monostearate, etc.; and water-soluble amines such as monoethanolamine, diethanolamine, etc. (Meth)acrylic acid in the present invention means an acrylic acid and a methacrylic acid corresponding thereto, and alkyl (meth)acrylate means an alkyl acrylate and an alkyl methacrylate corresponding thereto.

Further, the acrylic acid polymers and their ammonium salts may include, for example, an acrylic acid polymer and its ammonium salt, a methacrylic acid polymer and its ammonium salt, and a copolymer of ammonium (meth)acrylate and alkyl (methyl, ethyl or propyl) (meth)acrylate.

Specifically, poly(ammonium (meth)acrylate) and a copolymer of ammonium (meth)acrylate and methyl (meth)acrylate are preferred. In case the latter is used, the molar ratio of the ammonium (meth)acrylate to the methyl (meth)acrylate, that is, ammonium (meth)acrylate/methyl (meth)acrylate is preferably 10/90 to 90/10.

Further, the acrylic acid polymer or its ammonium salt preferably has a weight average molecular weight (value obtained by measuring with a GPC and calculated in terms of standard polystyrene) of 1,000 to 20,000 and more preferably 5,000 to 20,000. When the weight average molecular weight exceeds 20,000, the change in grain size distribution with the lapse of time due to reaggregation tends to occur. On the other hand, when the weight average molecular weight is less than 1,000, the effects of dispersibility and anti-sedimentation are sometimes insufficient.

The amount of these dispersants to be added preferably ranges from 0.01 part by weight to 5 parts by weight based on 100 parts by weight of cerium oxide particles from the viewpoint of dispersibility and anti-sedimentation properties of particles in slurry. To enhance the dispersing effect, it is preferred to charge the dispersants simultaneously or substantially simultaneously into a dispersion machine together with the cerium oxide particles during the dispersion process. In a case where less than 0.01 part by weight of the dispersant is used based on 100 parts by weight of cerium oxide particles, the cerium oxide particles tend to sediment, and on the other hand, in a case where more than 5 parts by weight of the dispersant is used, the change in grain size distribution with the lapse of time due to reaggregation tends to occur.

In a method of dispersing these cerium oxide particles into water, a homogenizer, an ultrasonic dispersing machine, a ball mill or the like may be used in addition to a usual stirrer.

To disperse cerium oxide particles of a sub-$\mu$m order, it is preferred to use a wet type dispersion machine such as a ball mill, an oscillating ball mill, a planetary ball mill, and a medium stirring mill.

If the alkalinity of slurry is to be enhanced, an alkaline substance containing no metallic ion such as aqueous ammonia may be added during the dispersion process or after the process.

To the abrasive according to the present invention, N,N-diethylethanolamine, N,N-dimethylethanolamine, aminoethylethanolamine, anionic surfactants or the above-mentioned dispersants or the like may be added appropriately according to the manner of usage.

The aspect ratio of a primary particle, i.e., a crystallite, which forms the cerium oxide particles dispersed in the cerium oxide abrasive according to the present invention, is preferably 1 to 2, and a median value of 1.3. The aspect ratio can be measured by observation with a scanning type electron microscope (for example, Model S-900 manufactured by Hitachi, Ltd.).

In this abrasive, the cerium oxide particle preferably comprises 2 or more crystallites, and has grain boundaries.

The median value of diameters of cerium oxide particles having grain boundaries is preferably 60 to 1,500 nm, more preferably 100 to 1,200 rim, and most preferably 300 to 1,000 nm.

The median value of the diameters of the crystallites is preferably 5 to 250 nm, and more preferably 5 to 150 nm.

Particles having the median value of particle diameters of cerium oxide with grain boundaries of 300 to 1,000 nm, and the median value of crystalline diameters of 10 to 50 nm are preferably used.

Further, particles having the median value of particle diameters of cerium oxide with grain boundaries of 300 to 1,000 nm, and the median value of diameters of crystallites of 50 to 200 nm are preferably used.

The maximum diameter of a cerium oxide having grain boundaries is preferably 3,000 nm or less and the maximum diameter of crystallites is preferably 600 nm or less, and more preferably 10 to 600 nm.

In the present invention, the crystalline particle diameter and cerium oxide diameter having crystal particle boundaries can be measured by observation with the above described scanning type electron microscope (for example, Model S-900 manufactured by Hitachi, Ltd.). The diameter of the cerium oxide particle, or a slurry particle, can be measured by a laser diffractometry (using, for example, Master Sizer microplus produced by Malvern Instrument Co. Ltd.; refractive index: 1.9285, light source: He—Ne laser, absorption 0). Furthermore, the particle diameter of a particle can be obtained from the major axis and the minor axis of the particle. That is, the major axis and the minor axis of the particle are measured and the root of the product of major axis and the minor axis of the particle is defined as a particle diameter. Then, the volume of a sphere obtained by the resultant particle diameter is defined as a particle volume.

The median value is one in the distribution of the volume particle diameter, and means a particle diameter when the volume ratio becomes 50% after totalizing the volumes of particles from the smaller diameter of particle.

In a case where the cerium oxide particle is constituted by 2 or more crystallites and has crystal particle boundaries, it is preferred that cerium oxide particles, each of which has a particle diameter of 1 $\mu$m or more, occupy 0.1% by weight or more of the total weight of the cerium oxide particles. Such cerium oxide particles can polish a predetermined substrate while being broken during polishing.

The measurement of the content of cerium oxide particles having a particle diameter of 1 $\mu$m or more is performed by measuring the intensity of transmitted light shielded by particles using an in-liquid particle counter. As a measuring device, a commercially available device (for example, model 770 Accu-Sizer (trade name) produced by, Particle Sizing System Inc.) can be used.

The cerium oxide particle constituted by 2 or more crystallites having grain boundaries preferably polishes a predetermined substrate while presenting, a new surface which is not yet in contact with a medium during polishing.

Further, it is preferable that the cerium oxide particle constituted by 2 or more crystallites having grain boundaries has a ratio of the content of cerium oxide particles having a particle diameter of 0.5 μm or more measured by a centrifugal sedimentation process after the polishing of a predetermined substrate to the content of cerium oxide particles having a particle diameter of 0.5 μm or more measured by a centrifugal sedimentation process before the polishing of 0.8 or less.

Further, it is preferred that the cerium oxide particle constituted by 2 or more crystallites having grain boundaries has a ratio of the cerium oxide particle diameter of D99% by volume measured by a laser diffractometry after the polishing of a predetermined substrate to the cerium oxide particle diameter of D99% by volume measured by a laser diffractometry before the polishing of 0.4 or more and 0.9 or less.

Further, it is preferable that the cerium oxide particle constituted by 2 or more crystalline grains having grain boundaries has a ratio of the cerium oxide particle diameter of D90% by volume measured by a laser diffractometry after the polishing of a predetermined substrate to the cerium oxide particle diameter of D90% by volume measured by a laser diffractometry before the polishing of 0.7 or more and 0.95 or less.

Here, the D99% and D90% mean particle diameters when the particle diameters become 99% and 90% respectively, after totalizing the volumes of particles from the smaller diameter of particle, in the distribution of the volume particle diameter.

Incidentally, the centrifugal sedimentation method is to measure the intensity of light transmitted through cerium oxide particles settled by centrifugal force to obtain the content of the cerium oxide particles. As the measuring apparatus, for example, SA-CP4L (trade name) produced by Shimadzu Corp.) may be used.

Further, a state after a predetermined substrate has been polished means the state after a predetermined substrate is set on a holder on which a substrate-mounting adsorption pad for supporting the substrate to be polished, and the holder is placed on a platen to which a piece of porous urethane resin polishing cloth is stuck with the surface to be polished down, further a weight is placed thereon so that the working load reaches 300 g/cm$^2$ and the surface to be polished is polished by rotating the platen for a predetermined period of time at a rotation speed of 30 min$^{-1}$ (30 rpm) while dropping the abrasive on the platen at a dropping rate of 50 ml/min. At that time, the abrasive used for polishing is circulated for reuse. The total amount of the abrasive is 750 ml.

The measurement by a laser diffractometry can be performed with Master Sizer microplus (trade name) manufactured by Malvern Instrument Co., Ltd. (refractive index: 1.9285, light source: He—Ne laser).

The abrasive according to the present invention contains a slurry in which abrasive grains having pores are dispersed into a medium. Here, as the abrasive grains cerium oxide particles are preferably used.

The pore preferably has a pore ratio of 10 to 30% obtained from the ratio between the density measured using a pycnometer and a theoretical density obtained by the X-ray Rietveld analysis. A pore volume measured by B. J. H. (Barret, Joyner, Halende) method is preferably 0.02 to 0.05 cm$^3$/g.

Further, the abrasive according to the present invention contains a slurry in which cerium oxide particles having a bulk density of 6.5 g/cm$^3$ or less are dispersed into a medium. Here, the density is preferably 5.0 g/cm$^3$ or more and 5.9 g/cm$^3$ or less, and as the medium, pure water is preferably used. This slurry can contain a dispersant, and as a dispersant, at least one selected from a water-soluble inorganic polymer, a water-soluble anionic surfactant, a water-soluble nonionic surfactant and a water-soluble amine is preferred, and a salt of a polyacrylic acid polymer can be preferably used, and an ammonium salt thereof can be more preferably used.

The pH of the abrasive according to the present invention is preferably 7 to 10, and more preferably 8 to 9 in the points of polishing properties, dispersibility of cerium oxide particles, anti-sedimentation properties and the like.

Films to be polished by the abrasives according to the present invention may include, for example, inorganic insulating films, specifically, an SiO$_2$ film formed by the CVD method using SiH$_4$ or tetraethoxysilane (TEOS) as an Si source and oxygen or ozone as an oxygen source.

As a predetermined substrate, a semiconductor substrate in a phase of circuit elements and aluminum wirings formed thereon or a semiconductor substrate in a phase of circuit elements formed thereon and further an SiO$_2$ insulating film layer formed thereon can be used. Also, a substrate including an SiO$_2$ insulating film formed for the purpose of semiconductor isolation (Shallow trench isolation) can be used.

By polishing an SiO$_2$ insulating film layer formed on such a semiconductor substrate with the above-mentioned abrasive, depressions and projections on the surface of the SiO$_2$ insulating film layer are removed thereby to form a smooth surface over the entire surface of the semiconductor substrate.

Here, as a polishing device, a typical polishing device having a platen (on which a motor or the like whose number of revolutions is changeable is mounted) to which a holder, which holds a semiconductor device, and a piece of polishing cloth (a pad) are adhered, can be used.

As the polishing cloth, a general nonwoven fabric, an expanded polyurethane, porous fluorine resins or the like can be used without specific limitation. Further, it is preferred that in the polishing cloth a groove in which slurry is stored be formed.

Although the polishing conditions have no limitation, a low rotational speed of 100 min$^{-1}$ is preferred for the rotational speed of a platen so that a semiconductor does not come off, and the pressure applied to the semiconductor substrate is preferably 10$^5$ Pa (1 kg/cm$^2$) or less so that no scratches will be present after polishing.

During polishing, a slurry is continuously supplied to the polishing cloth with a pump or the like. Although the supply amount of the slurry is not limited, it is preferred that the surface of the polishing cloth be always covered with the slurry.

Preferably, the polished semiconductor substrate should be rinsed well in running water and water drops attached onto the semiconductor substrate should be shaken off and dried by using a spin dryer or the like. On an SiO$_2$ insulating film layer smoothed in this manner, an aluminum wiring, which is the second layer, is formed, then an SiO$_2$ insulating layer is formed again between the wires and on the wiring by the above-mentioned method, and subsequently the recessions and projections on the surface of the insulating layer are removed by polishing them with the above-mentioned cerium oxide abrasive, whereby a smooth surface is formed over the entire surface of the semiconductor substrate. By repeating this step with predetermined times, a semiconductor having a desired number of layers can be manufactured.

Predetermined substrates according to the present invention include a substrate on which an $SiO_2$ insulating film is formed, a wiring board on which an $SiO_2$ insulating film is formed, an inorganic insulating film such as glass and silicon nitride, an optical glass such as a photomask, a lens and a prism, an inorganic conducting film such as ITO, an optical integrated circuit, an optical switching element, an optical waveguide formed by glass and crystalline materials, an end surface of optical fiber, optical single crystal for a scintillator or the like, a solid laser single crystal, an LED sapphire substrate for blue laser, a semiconductor single crystal such as SiC, GaP, GaAs, etc., a glass substrate for a magnetic disc, a magnetic head and the like. The cerium oxide abrasive according to the present invention is used for polishing the above-mentioned substrates.

EXAMPLES

Next, the present invention will be described in detail by Examples.

Example 1

Preparation of Cerium Oxide Abrasive

A cerium carbonate hydrate was charged into a rotary kiln (kiln diameter: $\phi$250 mm, kiln length L: 4000 mm) at a charging rate of 9 kg every hour, and was calcined for one hour while blowing air at a temperature of 800° C. (the temperature rise speed at which the charged cerium carbonate hydrate rises to a calcining temperature of 800° C. was 53° C./min). 1 kg of the cerium oxide powder thus obtained was dry-ground using a jet mill to obtain cerium oxide particles. 1 kg of the cerium oxide particles, 23 g of an aqueous ammonium polyacrylate solution (40% by weight), and 8,977 g of pure water were mixed together, and ultrasonic dispersion was performed for 10 minutes while stirring the mixture. The obtained slurry was filtered with a 1 $\mu$m filter and pure water was further added to the slurry to obtain 3% by weight of an abrasive.

A primary particle diameter of the cerium oxide particles was observed and measured with the above-mentioned scanning type electron microscope (S-900 manufactured by Hitachi, Ltd.). The particles had diameters of 20 to 500 nm with the volume distribution median value of 80 nm. Further, the aspect ratio of the primary particle was a median value of 1.3. Moreover, a secondary particle diameter was measured using a laser diffractometry (measuring device: Master Sizer microplus manufactured by Malvern Instrument Co. Ltd., measured with refractive index: 1.9285, light source: He—Ne laser, adsorption: 0) and the median value was 300 nm and the maximum particle diameter was 2,600 nm. Further, the bulk density of these particles was measured using a picnometer, resulting in 5.25 $g/cm^3$. Further, the ideal density by an X-ray leat belt analysis was 7.200 $g/cm^3$. A pore ratio was calculated from these values, and it was 27.1%. Additionally, the fine pore volume was measured by B.J.H. method. As a result, it was 0.040 $cm^3/g$.

In the same manner, a measurement was performed with particles taken out of the abrasive. As a result, the intensity ratio of the area of a primary peak appearing at 27 to 30° to that of a secondary peak appearing at 32 to 35° (primary peak/secondary peak) was 3.35. (Polishing of insulating film layer)

An $SiO_2$ insulating film (thickness: 1.5 $\mu$m) formed on a 8" wafer by TEOS-plasma CVD method was polished for one minute with a CMP polishing device (Type EPO-111, manufactured by Ebara Co.). Polishing was performed while dropping a cerium oxide slurry (solid content: 1% by weight) at a dropping rate of 200 ml/min under the polishing conditions of load: 30 kPa, back pressure: 15 kPa, revolution number of platen: 75 $min^{-1}$, revolution number of carrier: 75 $min^{-1}$.

After polishing, the wafer was removed from the holder and cleaning of the wafer was performed by pure water brush washing using a PVA sponge brush for one minute, megasonic pulse cleaning for one minute, pure water rinsing for one minute, and spin drying for one minute with a cleaning device (wafer scrubber manufactured by Tokyo Microtec Co.). Wafer thickness before and after polishing was measured at 49 points in the wafer with a film thickness measuring device (Optical Interferometer LAMBDA Ace VLM8000-LS manufactured by Dai Nippon Screen Production Co.) and the polishing speed was obtained by dividing the difference between the average value of the film thickness before polishing and that of the film thickness after polishing by the polishing time. As a result, the polishing speed by this polishing was 5325 Å/min, and it was found that the entire wafer surface had a uniform thickness. Foreign substances and defects on the polished wafer were detected with a particle counter (SFS6220 surface foreign substance detector manufactured by KLA Ten Call Co.) and the foreign substances and defects were observed by a review station (AL2000 wafer appearance inspection microscope manufactured by Olympus Optical Co., Ltd., magnification: 800 to 1600 times, dark field observation) based on all of the coordinate data on the wafer. Then, the foreign substances and defects were classified and the number of scratches caused by polishing was obtained. As a result, the polishing scratches on one wafer were less than 30. Further, the particle diameters of the abrasive A after polishing were measured with a centrifugal sedimentation type grain size distribution meter. As a result, the ratio of the content (% by volume) of a polished particle having a diameter of 0.5 $\mu$m or more to that of before polishing was 0.455. Further, the particle diameters of the abrasive after polishing were measured with a laser scatter type grain size distribution meter, and the obtained diameters of D99% and D90% were 0.521 and 0.825 respectively, based on the values before polishing.

Example 2

(1) Preparation of Cerium Oxide Particles a. Preparation of Cerium Oxide Particles A 2 kg of cerium carbonate hydrate was charged into a platinum vessel, and the vessel was heated at a temperature rise rate of 80° C./min. Then, the hydrate was calcined at 800° C. for 2 hours while blowing air (10 L/min) thereby to obtain about 1 kg of yellowish white powder. This powder was phase-identified by an X-ray diffractometry whereby it was confirmed to be cerium oxide.

The particle diameter of the resultant calcined powder was 30 to 100 $\mu$m. When a surface of the calcined powder particle was observed by a scanning type electron microscope, grain boundaries were found. When the crystallite diameter of cerium oxide each surrounded by a grain boundary was measured, the median value of the distribution was 190 nm and the maximum value was 500 nm.

1 kg of this cerium oxide powder was dry-ground using a jet mill. The observation of this ground particles was made with a scanning type electron microscope and not only small size particles having the same size as that of the crystallite diameter but also large size polycrystalline particles of 1 to 3 $\mu$m and polycrystalline particles of 0.5 to 1 $\mu$m were mixed with each other. The polycrystalline particles were not agglomerate of single crystalline particles. The cerium oxide particles obtained by grinding are hereinafter referred to as cerium oxide particles A.

Then, when the primary particle diameter of the cerium oxide particles A was observed and measured by a scanning type electron microscope, it was 50 to 500 nm and the volume distribution median value was 90 nm. Further, the aspect ratio of the primary particle was the median value of 1.2. Additionally, when the secondary particle diameter was examined using a laser diffractometry, the median value was 350 nm and the maximum particle diameter was 2800 nm.

b. Preparation of Cerium Oxide Particles B 2 kg of cerium carbonate hydrate was charged into a platinum vessel, and the vessel was heated at a temperature rise rate of 70° C./min. Then, the hydrate was calcined at 700° C. for 2 hours while blowing air (10 L/min) thereby to obtain about 1 kg of yellowish white powder. This powder was phase-identified by an X-ray diffractometry whereby it was confirmed to be cerium oxide.

The particle diameter of the resultant calcined powder was 30 to 100 µm. When a surface of the calcined powder particle was observed by a scanning type electron microscope, grain boundaries of cerium oxide were found. When the crystallite diameter of cerium oxide each surrounded by a grain boundary was measured, the median values of the distribution was 50 nm and the maximum value was 100 nm.

1 kg of this cerium oxide powder was dry-ground using a jet mill. The observation of this ground particles was made with a scanning type electron microscope and not only small size particles having the same size as that of the crystal diameters but also large size polycrystalline particles of 1 to 3 µm and polycrystalline particles of 0.5 to 1 µm were mixed with each other. The polycrystalline particles were not agglomerate of single crystalline particles. The cerium oxide particles obtained by grinding are hereinafter referred to as cerium oxide particles B.

Further, the primary particle diameter of the cerium oxide particles B was 60 to 550 nm, and the volume distribution median value of 80 nm. Further, the aspect ratio of the primary particle was the median value of 1.15. Additionally, when the secondary particle diameter was examined using a laser diffractometry, the median value was 400 nm and the maximum particle diameter was 2900 nm.

(2) Preparation of Abrasive 1 kg of the cerium oxide particles A or B obtained in the above-mentioned step (1), 23 g of an aqueous ammonium polyacrylate solution (40% by weight) and 8,977 g of deionized water were mixed and ultrasonic dispersion was performed for 10 minutes while stirring thereby to disperse the cerium oxide particles. As a result, a slurry was obtained.

The obtained slurry was filtered with a 1 micron-filter, and deionized water was further added to the slurry to obtain 3% by weight of an abrasive. The pHs of both slurries using the cerium oxide particles A and B were 8.3. The abrasive obtained from the cerium oxide particles A is hereinafter referred to as an abrasive A. On the other hand, the abrasive obtained from the cerium oxide particles B is hereinafter referred to as an abrasive B.

The abrasive A or B was diluted at a suitable concentration and dried to take out particles in the slurry. Powder X-ray diffraction measurement of particles taken out from the abrasive A was made and the intensity ratio of the area of a primary peak appearing at 27 to 30° to that of a secondary peak appearing at 32 to 35° (primary peak/secondary peak) was calculated from the diffraction chart, resulting in 3.36. Further, the particles were observed with the scanning electron microscope and the polycrystalline particle diameters were measured. The median value of the diameter of the particles was 825 nm and the maximum value thereof was 1230 nm. Then, the bulk density of this particles was measured with a pycnometer and the measured value was 5.78 g/cm$^3$. Additionally, the ideal density by an X-ray Rietveld analysis was 7.201 g/cm$^3$. A pore ratio was calculated from these values, resulting in 19.8%. Further, the fine pore volume was measured by B. J. H. method, and the resultant value was 0.033 cm$^3$/g.

Also, the particles removed from the abrasive B were measured, and the intensity ratio of the area of a primary peak appearing at 27 to 30° to that of a secondary peak appearing at 32 to 35° (primary peak/secondary peak) exhibited 3.52.

(3) Polishing of Insulating Films

An Si wafer on which an SiO$_2$ insulating film (film I) was formed by TEOS-plasma CVD method was adsorbed on a substrate mounting adsorption pad adhered to a holder to fix thereto. This holder was placed on a platen to which a porous polyurethane resin polishing pad is adhered with an insulating film surface down while holding the Si wafer, and a weight was placed thereon so that the working load reaches 300 g/cm$^2$.

Next, while dropping an abrasive A (solid content: 3% by weight) prepared in this Example on a platen at a dropping speed of 50 ml/min, the platen was rotated at the rotary speed of 30 min$^{-1}$ (30 rpm) for 2 minutes to polish the insulating film. After polishing, the wafer was taken away from the holder and washed sufficiently with running water, and the wafer was cleaned for further 20 minutes with an ultrasonic cleaner. After cleaning the wafer, drops of water were removed with a spin dryer and the wafer was dried at 120° C. with an oven.

With regard to the dried wafer, film thickness change before and after polishing was measured with an optical a interference type film thickness measuring device. As a result, it was found that in a case where the abrasive A was used, a 450 nm thick (polishing speed: 225 nm/min) insulating film was polished and the wafer had uniform thickness over the entire surface thereof. Further, when the surface of the insulating film was observed with an optical microscope, no clear scratch was found.

With a wafer on which an SiO$_2$ insulating film (film II) made by TEOS-plasma CVD method was formed by using a different device from the above-mentioned one, and with a wafer on which an SiO$_2$ insulating film (film III) prepared by a thermal oxidation process was formed, polishing was studied. As a result, in the case where the abrasive A was used, insulating films of 420 nm (polishing speed: 210 nm/min) and of 520 nm (polishing speed: 260 nm/min) were polished respectively, and it was found that in both cases, the entire wafers had uniform thicknesses. Further, when the surfaces of the insulating films were observed with the optical microscope, no clear scratch was found in both cases.

In the same manner as mentioned above, polishing of an insulating film (film I) was studied while dropping the abrasive B (solid content: 3% by weight) prepared in the present Example on a platen at a dropping speed of 50 ml/min. As a result, it was found that a 430 nm thick (polishing speed: 215 nm/min) insulating film was polished and the wafer had a uniform thickness over the entire surface thereof. Further, when the surface of the insulating film was observed with an optical microscope, no clear scratch was found. With a wafer on which an SiO$_2$ insulating film (film II) made by TEOS-plasma CVD method was formed by using a further different device, and with a wafer on which an SiO$_2$ insulating film (film III) made by a thermal oxidation process was formed, polishing was studied. As a result, in the case where the abrasive B was used, insulating films of 400 nm (polishing speed: 200 nm/min) and of 490 nm (polishing speed: 245 nm/min) were polished respectively, and it was found that in both cases, the entire surface of wafers had uniform thickness. Further, when the surfaces of the insulating films were observed with an optical microscope, no clear scratch was found in both cases.

Further, using the abrasive A, an SiO$_2$ insulating film on the surface of an Si wafer was polished in the same manner as mentioned above, and the particle diameters of abrasive A after polishing were measured with a centrifugal sedimentation type grain size distribution meter. As a result, the ratio of the content (% by volume) of particles after polishing having a diameter of 0.5 μm or more to that of particles before polishing was 0.385. Further, when the particle diameters of the abrasive A after polishing were measured with a laser scatter type grain size distribution meter, the obtained diameters of D99% and D90% were 0.491 and 0.804, respectively, based on the values before polishing.

Comparative Example 1

(1) Preparation of Cerium Oxide Particles C 2 kg of cerium carbonate hydrate was charged into a platinum vessel, and the vessel was heated at a temperature rise rate of 15° C./min. Then, the hydrate was calcined at 800° C. for 2 hours under reduced pressure (10 mmHg) to obtain about 1 kg of yellowish white powder. This powder was phase-identified by an X-ray diffractometry whereby it was confirmed to be cerium oxide.

The particle diameter of the resultant calcined powder was 30 to 100 μm and grain boundaries of cerium oxide were observed.

1 kg of this cerium oxide powder was dry-ground using a jet mill as in Example 2. As a result, not only small size particles having the same size as that of the crystallite diameters but also large size polycrystalline particles of 1 to 3 μm and polycrystalline particles of 0.5 to 1 μm were mixed with each other. The polycrystalline particles were not agglomerate of single crystalline particles. The cerium oxide particles obtained by grinding are hereinafter referred to as cerium oxide particles C.

Further, the primary particle diameter of the cerium oxide particles C was observed and measured with a scanning type electron microscope. As a result, the measured value was 150 to 700 nm, with the volume distribution median value of 250 nm. Further, the aspect ratio of the primary particle was a median value of 1.6. Additionally, when the secondary particle diameter was examined using a laser diffractometry, the median value was 1,100 nm and the maximum particle diameter was 3,500 nm.

(2) Preparation of Abrasive C 1 kg of cerium oxide particle C obtained in the above-mentioned step (1), 23 g of an aqueous ammonium polyacrylate solution (40% by weight) and 8,977 g of deionized water were mixed to obtain 3% by weight of an abrasive as in Example 2. The pH of the slurry was 8.3. The abrasive obtained from the cerium oxide particles C is hereinafter referred to as an abrasive C.

By using the above-mentioned abrasive C, the intensity ratio of the area of a primary peak appearing at 27 to 30° to that of a secondary peak appearing at 32 to 35° (primary peak/secondary peak) of particles taken out as in the same manner as Example 2 was calculated thereby to obtain the value of 3.01.

(3) Polishing of Insulating Film

Using the above-mentioned abrasive C, the polishing of the insulating film (film I) was studied as in Example 2. The results are shown in Table 1 at the end of the table including the results of the abrasives A and B in Example 2.

The entire surface of a wafer polished using the abrasive C was uniform in thickness and no clear scratch was found. However, a 360 nm thick (polishing speed: 180 nm/min) insulating film was ground by this polishing, which was about 20% lower in value than in the case of the abrasive A or B of the present invention even though it was calcined at the same temperature.

With a wafer on which an SiO$_2$ insulating film (film II) prepared by a TEOS-plasma CVD method was formed by using a different device, and with a wafer on which an SiO$_2$ insulating film (film III) prepared by a thermal oxidation process was formed, polishing was studied. As a result, in the case where the abrasive C was used, insulating films of 250 nm (polishing speed: 125 nm/min) and of 520 nm (polishing speed: 260 nm/min) were polished respectively, and the polishing speeds were twice different at maximum due to the film properties of a surface to be polished.

TABLE 1

|  | Abrasive | Powder X-ray diffraction Integrated intensity ratio | Polishing speed (nm/min) | | |
| --- | --- | --- | --- | --- | --- |
|  |  |  | Film I | Film II | Film III |
| Example 2 | A | 3.36 | 225 | 210 | 260 |
|  | B | 3.52 | 215 | 200 | 245 |
| Comparative example 1 | C | 3.09 | 180 | 125 | 260 |

Industrial Applicability

The method for producing cerium oxide according to the present invention can easily produce cerium oxide which is an essential component of a cerium oxide abrasive capable of polishing a surface to be polished such as an SiO$_2$ insulating film at high speed without causing scratches, with good yield.

The cerium oxide abrasive of the present invention can polish a surface to be polished such as an SiO$_2$ insulating film at high speed without causing scratches.

The abrasive of the present invention can polish a surface to be polished such as an SiO$_2$ insulating film at high speed without causing scratches irrespective of film properties.

The method for polishing a substrate according to the present invention can polish a surface to be polished such as insulating films at high speed without causing scratches irrespective of film properties.

The method for manufacturing a semiconductor device according to the present invention can manufacture a semiconductor excellent in reliability with good yield and high productivity.

What is claimed is:

1. A method for producing cerium oxide comprising rapidly heating a cerium salt to a calcining temperature of said salt at a temperature rise rate of 20° to 200° C./min, and thereafter calcining the cerium salt to produce cerium oxide.

2. The method for producing cerium oxide according to claim 1, wherein calcination is performed by a rotary kiln.

3. The method for producing cerium oxide according to claim 2 wherein the calcining temperature is from 600 to 1,000° C. and a calcining time is from 30 minutes to 2 hours.

* * * * *